Feb. 9, 1954    W. H. HENRICH    2,668,938
INVERTER FOR THREE PHASE SYSTEM
Filed Feb. 26, 1952    2 Sheets-Sheet 1
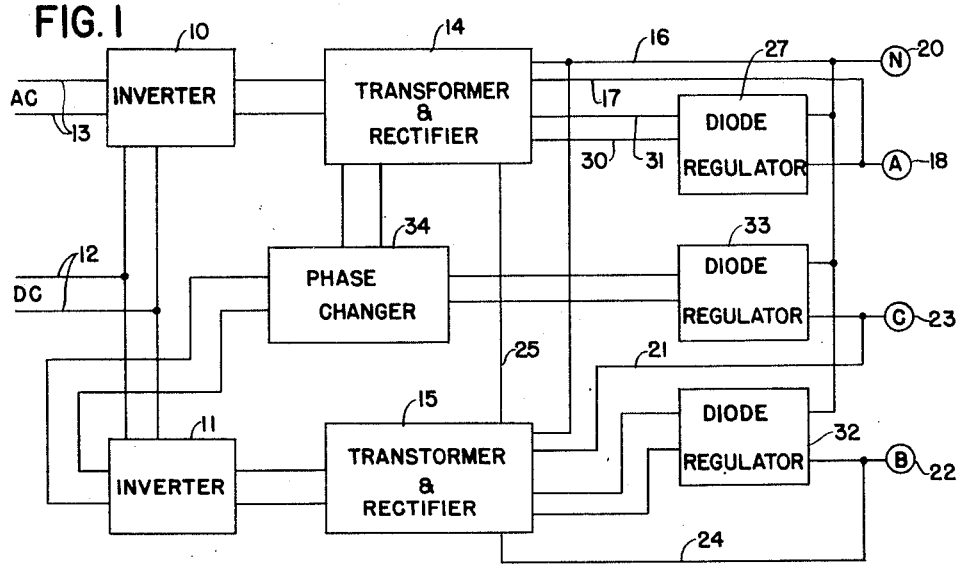
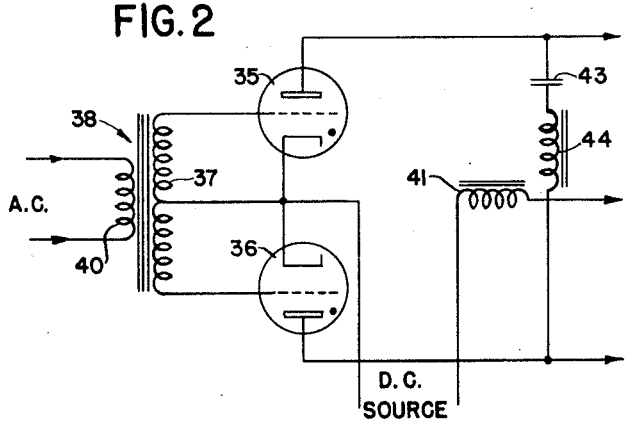
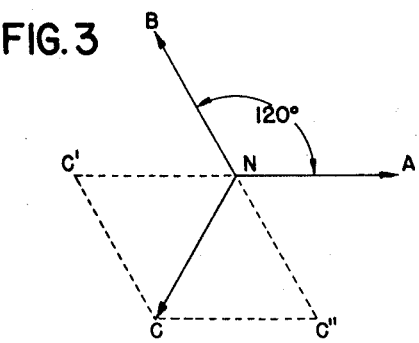
*INVENTOR.*
WILLIAM H. HENRICH
BY
*Ralph E. Bitner*
*ATTORNEY*

Feb. 9, 1954 W. H. HENRICH 2,668,938
INVERTER FOR THREE PHASE SYSTEM
Filed Feb. 26, 1952 2 Sheets-Sheet 2

INVENTOR.
WILLIAM H. HENRICH
BY
Ralph E. Bitner
ATTORNEY

Patented Feb. 9, 1954

2,668,938

UNITED STATES PATENT OFFICE 2,668,938

INVERTER FOR THREE-PHASE SYSTEM

William H. Henrich, East Norwalk, Conn., assignor to Sorensen & Company, Inc., Stamford, Conn., a corporation of Connecticut Application February 26, 1952, Serial No. 273,491

5 Claims. (Cl. 321—19)

This invention relates to a circuit for converting direct current into three-phase alternating current and has particular reference to a system of regulation which controls both the voltage of the output and also the phase relationship of the three-phase system. Some of the prior art systems have employed three inverter arrangements to convert direct current to the three independent alternating current systems. This arrangement is difficult to control and the phase angle between the three inverter outputs is generally variable and not dependable. Another prior art method of obtaining three-phase power is to use two inverters producing two-phase alternating currents and then employing a Scott transformer to transform the two-phase to three-phase. This system has many defects, one of which is the difficulty of obtaining a regulated output on all three phases.

One of the objects of this invention is to provide an improved circuit means which avoids one or more of the disadvantages and limitations of prior art arrangements.

Another object of the invention is to provide a three-phase power source with a regulated voltage and regulated phase angles, using a minimum of electronic equipment.

Another object of the invention is to provide voltage and phase regulation on a three-phase system, using only three regulating circuits.

The invention includes two electronic inverter circuits employing gas-filled electronic discharge devices as the means for converting direct current to alternating current. One of these inverters is controlled by an alternating current source which determines the frequency of the output and the phase of one of the three-phase outputs. The second inverter is controlled by a phase-changing circuit which receives its power from the output of the first inverter. Transformers coupled to these two inverters provide two of the output phases and the third phase is obtained by a series connection which includes a coil on each of the two transformers. Three diode regulator circuits are employed; two of them connected between the output phase and a transformer, the third regulator connected between the third phase and the phase-changing circuit.

For a better understanding of the present invention, together with other and further objects thereof, reference is made to the following description, taken in connection with the accompanying drawings.

Fig. 1 is a schematic diagram of connections in block form, illustrating the main components of the inverter system.

Fig. 2 is a detailed schematic diagram of connections of the inverter.

Fig. 3 is a vector diagram, illustrating the formation of the three-phase system.

Figure 4:
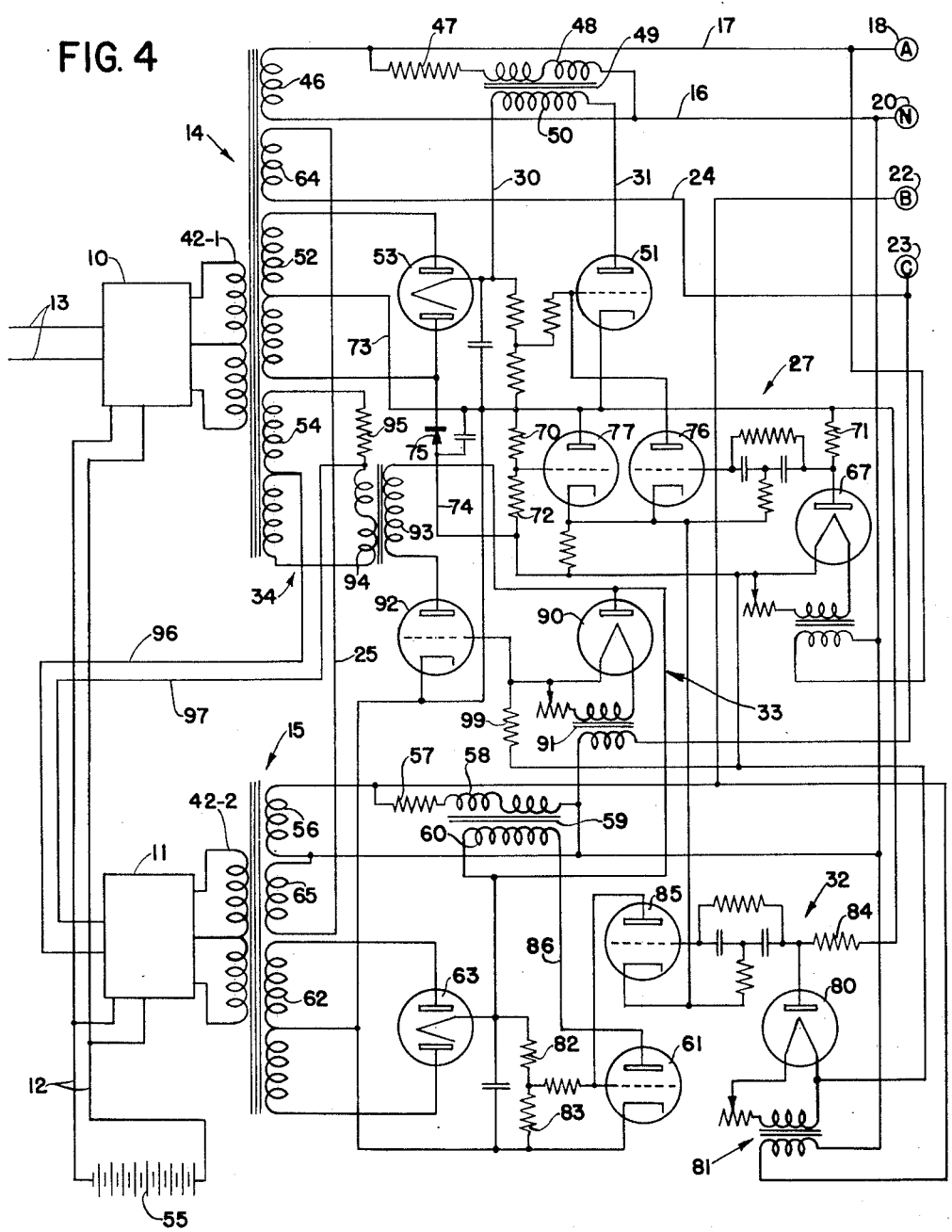
Fig. 4 is a schematic diagram of connections, showing the entire system with the exception of the inverters which are shown in block.

Referring now to Fig. 1, two inverters 10 and 11 receive direct current power from a common source 12. A source of alternating current 13 is applied to inverter 10 for frequency control purposes only. The power from inverter 10 is applied to a transformer and rectifier circuit 14 and in a similar manner the power from inverter 11 is applied to a second transformer and rectifier circuit 15. One of the output circuits from transformer 14 is connected to conductor 16 which serves as the neutral wire on the three-phase system. The other output conductor 17 is connected to a terminal 18 which comprises the first phase of the three-phase system. In a similar manner, the output from transformer 15 is connected to the neutral terminal 20 and, by way of conductor 21, to a terminal 22 which forms the second phase of the three-phase system. The third phase available at terminal 23 derives its power from a series connection running through both transformer circuits. This circuit may be traced over conductor 24 through transformer 14, then over conductor 25 through transformer 15, back to the neutral conductor 16. A first diode regulator 27 is connected across the first phase terminals 20 and 18 and the regulating currents are supplied directly to transformer 14 over conductors 30 and 31. A second diode regulator 32 is connected across the output of the second phase obtainable at terminals 20 and 22, the output of this regulator being applied directly to transformer 15. A third diode regulator 33 has its output circuit connected to the third phase obtainable at terminals 23 and 20, the regulating current of this circuit being applied directly to a phase changer 34.

Referring now to Fig. 2, a conventional inverter circuit is shown in which two gas-filled triodes 35 and 36 are arranged in push-pull connection. The control electrodes of these triodes are connected to the secondary 37 of a transformer 38. The primary 40 of this transformer is connected to a source of alternating current which determines the frequency of the output and generally determines the time relationship of one of the phases. A direct current source is applied between the cathodes of the gas discharge tubes and an inductor 41, the other end of this inductor being connected to the mid-point of an output transformer 42 shown in detail in Fig. 4. The anodes of tubes 35 and 36 are connected directly to transformer 42 in a conventional manner. Inverters of this type are fully described and explained in standard text books such as Theory and Applications of Electron Tubes by H. J. Reich, first edition, 1939, published by McGraw Hill Book Co., New York.

Referring now to Fig. 4, inverters 10 and 11 are shown in block form and are connected to output transformers 42—1 and 42—2. The secondary of transformer 14 comprises four coils, one coil 46 being applied directly to terminals 18 and 20 and forming the first phase of the system. This phase is represented in the vector diagram in Fig. 3 as the vector NA. For control purposes, the conductors 16 and 17 are bridged by a control circuit which contains a resistor 47 and an alternating current winding 44 of a saturable core reactor. The amount of such magnetic saturation is controlled by a direct current winding 50 which is connected by conductors 30, 31 to an amplifier tube 51 which is a part of diode regulator system 27. The transformer 14 also includes a secondary winding 52 which is connected to the anodes of a rectifier tube 53. The rectified current obtained from this circuit is employed to furnish power to the diode regulator circuit 27 and also to supply power to the phase changing regulator circuit 32.

A third secondary winding 54 on transformer 14 is employed to furnish a controlled and regulated alternating current supply to inverter 11. Both inverters 10 and 11 receive a direct current supply from a source 55 transmitted over conductors 12. In Fig. 4 this source is shown as a battery but any source of direct current may be used. Inverter 11 applies its output currents to primary windings 42—2 of transformer 15. A secondary coil 56 on this transformer is connected directly to the neutral terminal 29 and to output terminal 22, terminals 29 and 22 forming the second phase of the three-phase system and being represented on the diagram in Fig. 3 by the vector NB. This phase is also controlled by a circuit similar to the control circuit applied to the first phase and comprises a resistor 57, an alternating current winding 58 on the core of a saturable core reactor. A direct current winding 60 controls the amount of saturation in this reactor and is connected to an output amplifier tube 61 which receives its energy from the diode regulating system 32.

A secondary coil 62 on transformer 15 has its terminals applied to a rectifier circuit which includes a rectifier tube 63 and is for the purpose of supplying direct current to the diode rectifier circuit 32 and the regulation system. The third phase for the three-phase system is derived from two secondary coils 64 and 65, one coil being part of transformer 14 and the second being part of transformer 15. These coils are connected in series by conductor 25; one output conductor 24 connecting to output terminal 23, the other output conductor from coil 65 being connected back to the neutral point 29. Coils 64 and 65 are connected so that they produce voltages in opposition to phases 1 and 2. These voltages are represented in the vector diagram of Fig. 3 as vectors NC' and NC". Since the coils are connected in series, the resultant output voltage is the vector sum of the individual voltages and is shown in the vector diagram as the vector NC. It will be obvious that if a phase angle of 120° is maintained between phases A and B and if these two phases are voltage regulated to be equal, then phase C will be 120° from the other two phases and will also have the same regulated voltage.

Voltage regulation is maintained by means of a diode regulator tube, forming part of a four-armed Wheatstone bridge. A variation of diode resistance depends upon the current in the diode filament and this current is supplied through a step-down transformer from the output terminals. An increase in voltage at the output terminals increases the current through the diode filament, lowers the resistance of the diode and changes the unbalance of the bridge. This bridge unbalance is detected by an electronic amplifier arrangement, the output of which can be applied to a means for changing the voltage back to the desired regulated value. Such a diode regulator has been described and claimed in a Patent 2,455,143, issued to E. M. Sorensen on November 30, 1948, and, also in a Patent 2,569,500, issued to E. M. Sorensen on October 2, 1951.

In Fig. 4, diode 67 forms part of a Wheatstone bridge arrangement in which resistors 70, 71 and 72 are the other three bridge arms. The bridge is supplied with direct current which is applied between the junction points of resistors 70 and 71 as one terminal and the junction point between resistor 72 and the filament of diode 67 as the other terminal. Voltage supply for this bridge is derived from the lower coil of transformer secondary 52, conductor 73 serving as the neutral or ground potential source, and conductor 74, in series with a diode rectifier 75, furnishing a negative D. C. potential for the other bridge terminal. In order to sense a departure from a desired unbalance in this bridge system, amplifier tubes 76, 77 and 51 are employed. The unbalance voltage is applied to the control electrode of tube 77 which uses a cathode-follower type of coupling circuit to transfer its output to tube 76. The output of this tube is applied to the control grid of amplifier tube 51 and its output current is sent over conductor 31 through winding 50, thence over conductor 30 to the positive terminal of rectifier tube 53. In this manner, the unbalance voltage detected across the bridge terminals is transformed into a direct current which is applied to the saturable core reactor 49, thereby changing the reactance in parallel with terminals 18, 20 of the first phase.

The above-described regulator components are all a part of the diode regulator 27, shown in block form in Fig. 1. A similar set of components are included in diode regulator 32, the detail circuit of which is shown at the bottom of Fig. 4. In this circuit the resistive arms 70, 72, the cathode follower amplifier 77, and the supply of negative voltage on conductor 74 are all common to both diode regulating systems 27 and 33. Diode tube 80 has its filament connected through a step-down transformer 81 to output terminals 20 and 22 of the second phase. In this circuit, resistors 70, 72, and 84 comprise the other three arms of the Wheatstone bridge and amplifier tubes 61, 77, and 85 are employed to control an amplified direct current which is sent over conductor 86 through the direct current winding 60 on a saturable core reactor 59 to vary the voltage between terminals 20 and 22.

The third type of diode regulator is represented in Fig. 1 by the block 33 and includes a somewhat different regulator circuit. It includes a diode regulator tube 90, the filament of which is connected through a step-down transformer 91 to the third phase, having output terminals 20, 23. The diode 90 and resistor 99 form a voltage divider, the output of which is applied to the control electrode of an amplifier tube 92, the plate current of which passes directly through a direct current winding 93 which is part of a saturable core reactor. It will be evident that diode regulator 90 does not regulate voltage but instead varies the reactance in one portion of a circuit which is connected across secondary winding 54. The input to inverter 11 is derived from the mid-point of winding 54 and the junction point of winding 94 and a resistor 95. Varying the reactance of winding 94 causes the phase on the voltage transmitted over conductors 96, 97 to vary and, hence, controls the phase angle of the inverter with respect to phase AN.

To summarize, diode regulators 27 and 32 are controlled by the output voltages of the first and second phases NA and BN. The output control voltages of diode regulators 27 and 32 are applied directly to the two phases to control the voltage amplitude by means of a parallel reactor. The third diode regulator 33 is connected to the third phase CN and its output control current is applied to the phase changer 34, so that the addition of currents derived from the first and second phases, taken in a negative sense, produces a third phase which is equal in voltage magnitude to the other two phase voltages and with phase angles of 120° with both.

While there have been described and illustrated specific embodiments of the invention, it will be obvious that various changes and modifications may be made therein without departing from the field of the invention which should be limited only by the scope of the appended claims.

I claim:

1. A three phase inverter circuit controlled by a single phase alternating current supply for converting direct current power into a three phase system comprising, a first inverter circuit for converting direct current into alternating current, said first inverter circuit controlled in frequency and phase by the single phase supply and delivering its power to a first transformer having a secondary winding connected to the first phase terminals of the three phase system, a second inverter circuit for converting direct current into alternating current, said second inverter circuit controlled in frequency and phase by an alternating voltage derived from a phase changing circuit which shifts the voltage phase 120 degrees and is connected to another secondary winding in the first transformer, the output of the second inverter circuit connected to a second transformer having a secondary winding connected to the second phase terminals of the three-phase system, a series circuit including a secondary winding on the first transformer and a secondary winding on the second transformer, each of which produces a voltage equal in magnitude to the first and second phases but of opposite polarity, said series circuit connected to the third phase terminals of the three phase system, a regulator system for controlling the voltage of the first and second phases to maintain them equal to each other, and a regulator for controlling the phase angle between the first and second phases to maintain the third voltage equal to the voltages of the other two phases.

2. A three phase inverter circuit controlled by a single phase alternating current supply for converting direct current power into a three phase system comprising, a first inverter circuit for converting direct current into alternating current, said first inverter circuit including a three electrode gas-filled electron discharge device controlled in frequency and phase by the single phase supply and delivering its power to a first transformer having a secondary winding connected to the first phase terminals of the three phase system, a second inverter circuit for converting a direct current supply into an alternating current, said second inverter circuit including a three electrode gas-filled electron discharge device controlled in frequency and phase by an alternating voltage derived from a phase changing circuit which shifts the voltage phase 120 degrees and is connected to another secondary winding in the first transformer, the output of the second inverter circuit connected to a second transformer having a secondary winding connected to the second phase terminals of the three-phase system, a series circuit including a secondary winding on the first transformer and a secondary winding on the second transformer, each of which produces a voltage equal in magnitude to the first and second phases but of opposite polarity, said series circuit connected to the third phase terminals of the three-phase system, a regulator system for controlling the voltage of the first and second phases to maintain them equal to each other, and a regulator for controlling the phase angle between the first and second phases to maintain the third phase voltage equal to the voltages of the other two phases.

3. A three phase inverter circuit controlled by a single phase alternating current supply for converting direct current power into a three phase system comprising, a first inverter circuit for converting direct current into alternating current, said first inverter circuit including a three electrode gas-filled electron device controlled in frequency and phase by the single phase supply and delivering its power to a first transformer having a secondary winding connected to the first phase terminals of the three phase system, a second inverter circuit for converting a direct current supply into an alternating current, said second inverter circuit including a three electrode gas-filled electron discharge device controlled in frequency and phase by an alternating voltage derived from a phase changing circuit which shifts the voltage phase 120 degrees and is connected to another secondary winding in the first transformer, the output of the second inverter circuit connected to a second transformer having a secondary winding connected to the second phase terminals of the three-phase system, a series circuit including a secondary winding on the first transformer and a secondary winding on the second transformer, each of which produces a voltage equal in magnitude to the first and second phases but of opposite polarity, said series circuit connected to the third phase terminals of the three-phase system, two voltage regulator circuits each including a filamentary diode for controlling the voltage of the first and second phases to maintain their voltage values within a restricted predetermined range, and a third regulator circuit including a filamentary diode for controlling the phase angle between the first and second phases to maintain the third phase voltage equal to the voltages of the other two phases.

4. A three phase inverter circuit controlled by a single phase alternating current supply for converting direct current power into a three phase system comprising, a first inverter circuit for converting direct current into alternating current, said first inverter circuit including a three electrode gas-filled electron discharge device controlled in frequency and phase by the single phase supply and delivering its power to a first transformer having a secondary winding connected to the first phase terminals of the three phase system, a second inverter circuit for converting a direct current supply into an alternating current, said second inverter circuit including a three electrode gas-filled electron discharge device controlled in frequency and phase by an alternating voltage derived from a phase changing circuit which shifts the voltage phase 120 degrees and is connected to another secondary winding in the first transformer, the output of the second inverter circuit connected to a second transformer having a secondary winding connected to the second phase terminals of the three-phase system, a series circuit including a secondary winding on the first transformer and a secondary winding on the second transformer, each of which produces a voltage equal in magnitude to the first and second phases but of opposite polarity, said series circuit connected to the third phase terminals of the three-phase system, two voltage regulator circuits each including a filamentary diode in a bridge circuit for controlling the voltage of the first and second phases to maintain their voltage values within a restricted predetermined range, and a third regulator circuit including a filamentary diode connected to a saturable reactor for controlling the phase angle between the first and second phases to maintain the third phase voltage equal to the voltages of the other two phases.

5. A three phase inverter circuit controlled by a single phase alternating current supply for converting direct current power into a three phase system comprising, a first inverter circuit for converting direct current into alternating current, said first inverter circuit including a three electrode gas-filled electron discharge device controlled in frequency and phase by the single phase supply and delivering its power to a first transformer having a secondary winding connected to the first phase terminals of the three-phase system, a second inverter circuit for converting a direct current supply into an alternating current, said second inverter circuit including a three electrode gas-filled electron discharge device controlled in frequency and phase by an alternating voltage derived from a phase changing circuit which shifts the voltage phase 120 degrees and is connected to another secondary winding in the first transformer, the output of the second inverter circuit connected to a second transformer having a secondary winding connected to the second phase terminals of the three-phase system, a series circuit including a secondary winding on the first transformer and a secondary winding on the second transformer, each of which produces a voltage equal in magnitude to the first and second phases but of opposite polarity, said series circuit connected to the third phase terminals of the three-phase system, two voltage regulator circuits each including a filamentary diode in a bridge circuit for controlling the voltage of the first and second phases to maintain their voltage values within a restricted predetermined range, and a third regulator circuit including a filamentary diode connected to a saturable reactor for controlling the phase angle between the first and second phases to maintain the third phase voltage equal to the voltages of the other two phases, each of said three diode filaments effectively connected across their respective phase terminals.

WILLIAM H. HENRICH.

References Cited in the file of this patent

UNITED STATES PATENTS

| Number | Name | Date |
| --- | --- | --- |
| 2,333,502 | Wickham | Nov 2, 1943 |
| 2,340,875 | Gibbs | Feb. 8, 1944 |
| 2,530,784 | Pohm | Nov. 21, 1950 |
| 2,575,600 | Smith | Nov. 20, 1951 |
| 2,610,991 | Levy | Sept. 16, 1952 |
| 2,623,203 | Demuth | Dec. 23, 1952 |